United States Patent Office 3,654,309
Patented Apr. 4, 1972

3,654,309
PROCESS FOR THE PREPARATION OF
UNSATURATED ALDEHYDES
Alan Francis Thomas, Vernier, Geneva, Switzerland,
assignor to Firmenich & Cie, Geneva, Switzerland
No Drawing. Filed May 22, 1968, Ser. No. 731,277
Claims priority, application Switzerland, May 26, 1967,
7,511/67; Sept. 29, 1967, 13,652/67; May 10, 1968,
6,972/68
Int. Cl. C07d 63/12, 5/16; C07c 45/00
U.S. Cl. 260—332.3 R                                24 Claims

ABSTRACT OF THE DISCLOSURE

A process for preparation of $\alpha,\beta$-olefinically unsaturated carbonyl compounds of formula

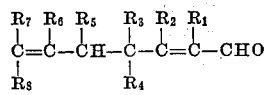

by condensing, with a condensing agent at 60° to 400° C., a butadienyl ether (or a substance which generates such ether) of formula

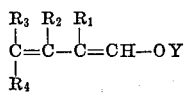

wherein Y is a linear or branched $C_1$–$C_4$ alkyl radical, or a benzyl, p-nitrobenzyl or furfuryl radical and $R_1$, $R_2$, $R_3$ and $R_4$ each is hydrogen or a linear or branched $C_1$–$C_6$ alkyl radical, with an allyl alcohol containing at least three carbon atoms and at least four carbon atoms less than the end product, of formula

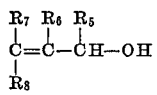

wherein $R_5$, $R_6$, $R_7$ and $R_8$ each is hydrogen, or
 (a) a linear or branched $C_1$–$C_8$ alkyl radical, or
 (b) a linear or branched $C_2$–$C_8$ olefinically unsaturated hydrocarbon radical containing at most two double bonds, or
 (c) $R_5$, $R_6$ and one of $R_7$ and $R_8$ each is as defined in (a) or (b) above and the other of $R_7$ and $R_8$ is an ethyl radical substituted on its terminal carbon atom with:
   (1) an unsubstituted or mono- or di-methyl-substituted $C_5$ or $C_6$ olefinically unsaturated cycloaliphatic group containing at most two double bonds one of which is in the $\alpha$-position relative to said terminal carbon atom, or
   (2) an unsubstituted or mono- or di-methyl-substituted $C_7$ olefinically unsaturated bridged cycloaliphatic group containing a double bond in the $\alpha$-position relative to said terminal carbon atom, or
   (3) a 2- or 3-furyl or a 2- or 3-thienyl group,
and two of the above-defined radicals $R_5$, $R_6$, $R_7$ and $R_8$ may be linked to each other (except $R_5$ to $R_6$) to form:
   (4) a $C_5$ or $C_6$ olefinically unsaturated cycloaliphatic ring which contains at most two double bonds and which may be substituted with $C_1$–$C_3$ alkyl or alkenyl groups, or
   (5) a $C_6$ olefinically unsaturated bridged cycloaliphatic ring which contains one double bond and which may be substituted with one or two methyl groups, or
   (6) a furan or thiophene ring which may be substituted with a methyl group.

Allyl alcohols and unsaturated hydrocarbons are also prepared by reducing the carbonyl compounds obtained as aforesaid.

Compounds obtained in the foregoing three categories have valuable odoriferous and/or flavoring properties and are useful in the manufacture of perfumes, perfumed products, foodstuffs and beverages. In many cases, the compounds are also useful as intermediates for synthesizing other odoriferous and/or flavoring compounds.

The present invention relates to a new process for preparing unsaturated carbonyl compounds, many of which are new substances. Most of these carbonyl compounds have valuable odoriferous and/or flavouring properties and are, therefore, useful as ingredients in the manufacture of perfumes and perfumed products and/or as flavouring agents for foodstuffs and beverages. Many of the said carbonyl compounds are also useful as intermediates for synthesising other odoriferous and/or flavouring compounds. The invention also comprises those of the said carbonyl compounds which are new.

Furthermore the invention relates to processes for preparing allyl alcohols and unsaturated hydrocarbons derived from the said carbonyl compounds and also comprises those of the allyl alcohols and hydrocarbons which are new. Most of these allyl alcohols and hydrocarbons also possess valuable organoleptic properties and are useful for the same purposes as the above mentioned unsaturated carbonyl compounds.

In an attempt to synthesise aldehydes of the following structural type

by condensing certain allyl alcohols with butadienyl ethers according to known methods [cf. L. Claison, Chem. Ber. 45, 3157 (1912)] it was found that the expected products could not be obtained but that instead carbonyl compounds of a totally different and unexpected structural type were formed. This discovery was the basis for the development of novel process for preparing unsaturated carbonyl compounds.

The present invention relates to a process for the preparation of olefinically $\alpha,\beta$-unsaturated carbonyl compounds which contain at least seven carbon atoms and as a building unit at least one group having the following carbon skeleton

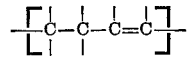

which comprises condensing, by heating in the presence of a condensing agent, either
(i) a butadienyl ether of formula

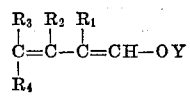

wherein Y represents a linear or branched alkyl radical containing from 1 to 4 carbon atoms, or a benzyl, p-nitrobenzyl or furfuryl radical, and each of the symbols $R_1$, $R_2$, $R_3$ and $R_4$ represents hydrogen or a linear or branched alkyl radical containing from 1 to 6 carbon atoms, or (ii) a substance capable of generating a butadienyl ether of Formula I under the condensation conditions, with (iii) an allyl alcohol which contains at least three carbon atoms and at least four carbon atoms less than the required end product and which corresponds to formula

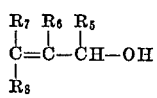

wherein each of the symbols $R_5$, $R_6$, $R_7$ and $R_8$ represents hydrogen, or (a) a linear or branched alkyl radical containing from 1 to 8 carbon atoms, or (b) a linear or branched olefinically unsaturated hydrocarbon radical containing at most two double bonds and from 2 to 8 carbon atoms, or wherein (c) $R_5$, $R_6$ and $R_7$ or $R_8$ have the meaning defined sub (a) and (b) whereas either $R_7$ or $R_8$ represents a substituted ethyl radical carrying on the terminal carbon atoms as a substituent an unsubstituted or mono- or di-methyl-substituted five- or six-membered olefinically unsaturated cycloaliphatic group containing at most two double bonds one of which is in the $\alpha$-position with respect to the said terminal carbon atom, or a substituted ethyl radical carrying on the terminal carbon atom as a substituent an unsubstituted or mono- or di-methyl-substituted seven-members olefinically unsaturated bridged cycloaliphatic group containing a double bond in the $\alpha$-position with respect to the said terminal carbon atom, or a substituted ethyl radical carrying on the terminal carbon atom as a substituent a 2- or 3-furyl, or 2- or 3-thienyl group, and wherein (d) two of the radicals represented by the symbols $R_5$, $R_6$, $R_7$ and $R_8$ can be linked to each other, except $R_5$ to $R_6$, to form a five- or six-membered olefinically unsaturated cycloaliphatic ring which contains at most two double bonds and which can carry as substituents alkyl or alkenyl groups containing from 1 to 3 carbon atoms, or a six-membered olefinically unsaturated bridged cycloaliphatic ring which contains one double bond and which can carry one or two methyl groups, or a furan or thiophene ring which can carry a methyl group, in order to form a carbonyl compound of formula

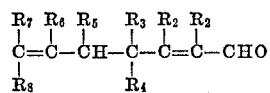

wherein the symbols $R_1$ to $R_8$ have the meaning defined above.

In the above Formula I of the starting butadienyl ethers the alkyl radicals represented by $R_1$, $R_2$, $R_3$ and $R_4$ include, e.g., methyl, ethyl, n-propyl, isopropyl, n-butyl, isobutyl, n-pentyl, isopentyl, n-hexyl and isohexyl. Preferred alkyl radicals are methyl and ethyl. A preferred class of butadienyl ethers includes, e.g., butadienyl ethers, 2 - methyl - butadienyl ethers, 2,4-dimethyl-butadienyl ethers, 2,4,4-trimethyl-butadienyl ethers, 3-ethyl-butadienyl ethers, 2-methyl-3-ethyl-butadienyl ethers, and more particularly those in which Y is methyl or ethyl.

In the above Formula II of the starting allyl alcohols $R_5$, $R_6$, $R_7$ and $R_8$ can represent linear alkyl radicals such as methyl, ethyl, n-propyl, n-butyl, n-pentyl, n-hexyl, n-heptyl and n-octyl, or branched alkyl radicals such as isopropyl, isobutyl, isopentyl, isohexyl, isoheptyl, isooctyl, 2-methylbutyl, 2-methylpentyl, 3-methylpentyl, 2-ethylpentyl, 3-ethylpentyl, 2,3-dimethylpentyl, 2,4-dimethylpentyl, 3,4-dimethylpentyl, 2,3,3-trimethylpentyl, 2,4-dimethyl-3-ethylpentyl, 2-methylhexyl, 3-methylhexyl, 4-methylhexyl, 2,3-dimethylhexyl, 2,4-dimethylhexyl, 2,5-dimethylhexyl, 3,4-dimethylhexyl, 3,5-dimethylhexyl, 3-ethylhexyl and 4-ethylhexyl. Preferred alkyl radicals are methyl and ethyl.

In Formula II $R_5$, $R_6$, $R_7$ and $R_8$ can also represent linear or branched olefinically unsaturated hydrocarbon radicals such as vinyl, allyl, 3-butenyl, 4-pentenyl, 5-hexenyl, 6-heptenyl, 7-octenyl,
3-ethyl-4-methyl-3-pentenyl,
2,3-dimethyl-3-pentenyl,
2,4-dimethyl-2,4-pentadienyl,
2,3,4-trimethyl-2,4-pentadienyl,
4-methyl-3-methylene-4-pentenyl,
2,3-dimethyl-2,4-pentadienyl,
3,4-dimethyl-2,4-pentadienyl,
4-methyl-2,4-pentadienyl,
3-methyl-2-pentenyl,
2,4-dimethyl-2-pentenyl,
3,4-dimethyl-2-pentenyl,
2-hexenyl,
4-hexenyl,
5-methyl-4-hexenyl,
5-ethyl-3-hexenyl,
4-ethyl-5-hexenyl,
2,4-dimethyl-3-ethyl-3-pentenyl,
2,4-dimethyl-3-pentenyl,
3,4-dimethyl-2,4-pentadienyl,
2-methyl-3-methylene-4-pentenyl,
2,4-dimethyl-3-methylene-4-pentenyl,
2,4-dimethyl-2,4-pentadienyl,
2-methyl-2,4-pentadienyl,
2-methyl-2-pentenyl,
4-methyl-2-pentenyl,
2,3-dimethyl-2-pentenyl,
2-methyl-2-hexenyl,
2,4-hexadienyl,
3,4-dimethyl-3-hexenyl,
5-ethyl-4-hexenyl,
3,5-dimethyl-3-hexenyl,
3,6-dimethyl-3-hexenyl,
2,3-dimethyl-4-hexenyl and
2,5-dimethyl-4-hexenyl.

A preferred group of unsaturated hydrocarbon radicals includes 3-methyl-3-pentenyl, 4 - methyl - 3 - pentenyl, 3-methylene-4-pentenyl and 3-methyl-2,4-pentadienyl.

In the event that in Formula II $R_7$ or $R_8$ represents a substituted ethyl radical, the substituent can be, e.g., a cyclopenten-1-yl, cyclohexen-1-yl, 3,3 - dimethyl - cyclohexen-1-yl, 3,3-dimethyl - 1,5 - cyclohexadienyl or 7,7-dimethyl-3-bicyclo[3.1.1]heptenyl group. A preferred class of substituent groups includes the 2- and 3-furyl and 3-thienyl groups.

Two of the radicals $R_5$, $R_6$, $R_7$ and $R_8$ can be linked to each other and form, together with their carrier carbon atoms, rings. If $R_6$ and $R_8$ are linked to each other, the resulting ring can be a furan, thiophene or 7,7-dimethyl-3-bicyclo[3.1.1]heptene ring. If $R_5$ and $R_7$ are linked to each other, the resulting ring can be a 2-methyl-5-isopropyl-1-cyclohexene or 2-methyl-5 - isopropenyl - cyclohexene ring.

A preferred class of starting allyl alcohols of Formula II includes 2-methyl-6-vinyl-2,6-heptadien-1-ol, 3,7-dimethyl-1,3,6-octatrien-8-ol, geraniol, nerol, crotyl alcohol, tiglic alcohol, 2,6-dimethyl-2,6-octadienol, furfuryl alcohol, thenyl alcohol, 3-methoxymethyl-furan, myrtenol, carveol, piperitol, 5-(3-furyl)-2-methyl-2-pentenol and 9-(3-furyl)-2,6-dimethyl-2,6-nonadienol (neotorreyol).

As a compound capable of generating I under the conditions of the condensation, a compound of formula

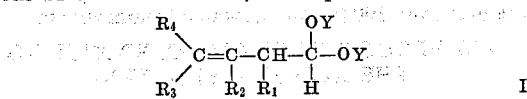

or of formula

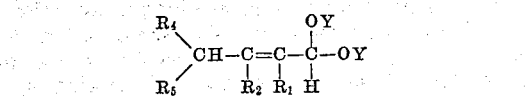

or of formula

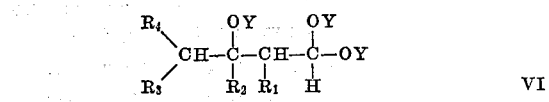

wherein $R_1$, $R_2$, $R_3$, $R_4$ and Y have the same meaning as in Formula I, can be used. Y is preferably a methyl or ethyl radical. As an example 2-methyl-1,1,3-triethoxybutane can be mentioned.

The nature of the condensing agent used in the process of the invention is not critical, and most of the conventional condensing agents can be used. These include mineral acids such as dry hydrogen chloride, sulphuric acid and phosphoric acid, organic acids such as acetic acid, tartaric acid, oxalic acid, malonic acid, phenyl-acetic acid, trifluor-acetic acid, and salts of the said acids with metals capable of forming metal-organic complexes such as magnesium, aluminium, chromium, manganese, silver, cadmium, mercury, iron, cobalt and palladium. Lewis acids such as boron trifluoride are also suitable condensing agents. Furthermore, acidic salts such as sodium or ammonium dihydrogenphosphate and sodium bisulphate can be used as condensing agents. Mixtures of at least two of the above mentioned condensing agents can also be used. Preferred condensing agents are mercuric acetate, phosphoric acid, ammonium dihydrogenphosphate and mixtures of phosphoric acid and ammonium dihydrogenphosphate.

The condensation can be carried out by heating the reactants at temperatures of 60 to 400° C. Heating at temperatures in the vicinity of 100° C. for several hours, e.g. 48 hours, is the preferred technique in many cases. In some instances it is, however, advantageous to heat the reactants at higher temperatures, e.g. at about 300 to 380° C., for a short period of a few seconds to a few minutes. It can also be advantageous to carry out the condensation in an inert atmosphere, e.g. under nitrogen or carbon dioxide.

Moreover, the condensation can be carried out in the presence of a high-boiling organic solvent such as polyethylene glycol ether, e.g. diglym or triglym, or a halogenated or nitrated aromatic hydrocarbon, e.g. p-dichlorobenzene or nitrotoluene. An excess of one of the starting butadienyl ethers or allyl alcohols can also serve as a solvent.

One of the essential advantages of the process according to the invention resides in the fact that the carbon chain of a given allyl alcohol of Formula II can be extended by one butadiene unit. This operation can be repeated in order to enlarge at will the molecule of a starting material. Indeed, the reduction of the carbonyl compound of Formula III with lithium aluminium hydride according to known processes yields easily the corresponding allyl alcohol which can again be used as a starting material in the process of the invention. This method is particularly convenient for the addition of methylated butadiene units, i.e. isoprene units.

The progressive addition of isoprene units is not per se a new accomplishment; it takes place for example in the formation of rubber (natural or synthetic) by polymerisation of isoprene or derivatives thereof, according to known procedures. However, the products obtained thereby are mixtures of substances of various molecular weights which cannot be separated by usual means. On the other hand, the process according to the invention allows to add at will just one, or successively several butadiene units to a given allyl alcohol.

The butadiene units added successively can be identical or different. After each extension step the product can be isolated and characterised.

One specific method of carrying out the process of the invention, therefore, consists in repeating at least once the condensation of a compound of Formula I or its precursor (cf. Formulae IV, V and VI) with a compound of Formula II using as a starting allyl alcohol a compound resulting from the reduction of a carbonyl compound obtained by a preceding condensation in order to form a carbonyl compound of Formula III comprising at least two building units having the carbon skeleton

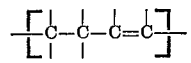

As an example of this embodiment, tiglic alcohol is condensed with 2-methyl-butadienyl ethyl ether by heating between 80 and 120° in the presence of mercuric acetate and sodium acetate in order to obtain 2,6-dimethyl-2,6-octadien-al. This compound is then reduced with lithium aluminum hydride to 2,6-dimethyl-2,6-octadien-ol which is again condensed according to the process of the invention with 2-methylbutadienyl ethyl ether by means of the same condensation agents to form 2,6,10-trimethyl-2,6,10-undecatrien-al which shows interesting organoleptic properties and is useful in the perfume and flavour industries. Furthermore, this aldehyde can be reduced again to the corresponding allyl alcohol. This sequence can be represented as follows:

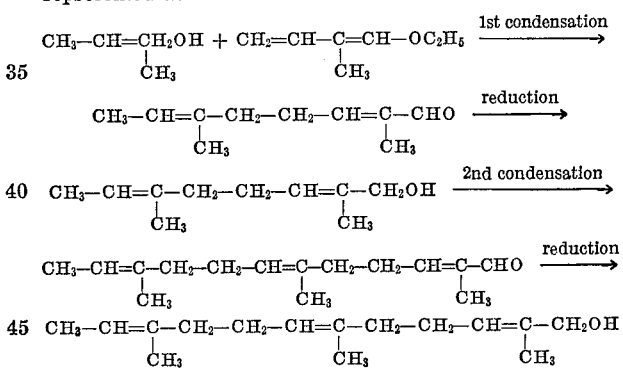

The above sequence can be continued as desired in order to form carbon chains of higher and higher molecular weight.

The invention also relates to a process for the preparation of allyl alcohols which contain at least seven carbon atoms and as a building unit at least one group having the following carbon skeleton

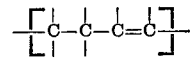

which comprises reducing by means of lithium aluminum hydride the carbonyl function of a carbonyl compound of Formula III obtained by condensing a compound of Formula I or its precursor (Formulae IV, V and VI) with a compound of Formula II. The reaction can be carried out according to conventional methods.

Furthermore, the invention relates to a process for the preparation of unsaturated hydrocarbons containing at least seven carbon atoms and as a building unit at least one group having the following carbon skeleton.

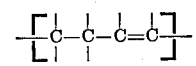

which comprises either reducing the carbonyl function of a carbonyl compound obtained by condensation of a compound of Formula I or its precursor (Formulae IV, V and VI) with a compound of Formula II, or by reducing the hydroxyl function of an allyl alcohol obtained according to the process defined above. The reduction of the carbonyl group can be carried out by means of hydrazine or a derivative thereof, e.g. tosylhydrazine, in the presence of a strong alkali such as sodium or potassium hydroxide according to known methods (cf. Tetrahydron 19, 1127 (1963)). The reduction of the hydroxyl function of an allyl alcohol can be brought about by treating its tosylate with sodium amalgam, lithium aluminum hydride or sodium iodide in acetic acid according to known methods (cf. Fieser & Fieser, Advanced Organic Chemistry, Reinhold Publ. Corp., New York (1961)).

As an example of using the processes of the invention, 3-hydroxymethylfuran is condensed with 2-methylbutadienyl ethyl ether in order to obtain, after heating at a temperature comprised between 350 and 400°, 2-methyl-5-(3-furyl)-2-penten-al which smells pleasantly and which can be used in the perfume industry. The corresponding allyl alcohol obtained by reduction with lithium aluminum hydride can be further reduced via its tosylate by known methods, for example with lithium aluminum hydride, to an odoriferous hydrocarbon, perillene, which is a constituent of the oil of *Perilla citriodora* (cf. for example: Guenther, The Essential Oils, p. 700) which is used in the perfume industry.

2-methyl-5-(3-furyl)-2-penten-ol, if condensed again according to the process of the invention with 2-methylbutadienyl ethyl ether, yields torreyal having a citrus-like odour, of formula

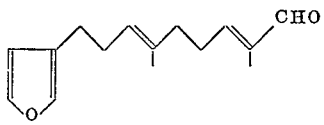

which, when reduced by the conventional methods already mentioned above, gives the corresponding alcohol, neotorreyol. These two substances are constituents of the oil of *Torreya nucifera* and are of interest to the flavour industry. The complete reduction of the oxygen function of these substances for example via the tosylhydrazone of torreyal according to known methods, or via the tosylate of neotorreyol, yields dendrolasin, an odoriferous product also contained in the oil of *Torreya nucifera* and in the body of certain ants (cf. for example Science 149, 1337 (1965)).

The process according to the invention is also useful for preparing α-sinensal and β-sinensal which are sesquiterpene aldehydes of formulae

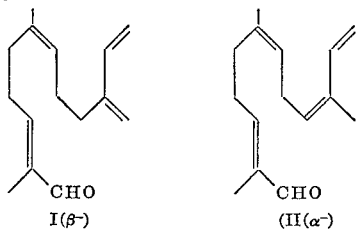

I(β-)   (II(α-)

α-Sinensal (II), β-sinensal and their conformers had hitherto not been prepared synthetically. With the process according to the invention it is now possible to synthesize them by condensing 2-methylbutadienyl ethyl ether with, respectively, ocimenol (3,7-dimethyl-1,3,6-octadien-8-ol) or myrcenol (2-methyl-6-vinyl-2,6-heptadien-1-ol) which can be obtained for example by $SeO_2$ oxidation of ocimene and myrcene, respectively.

In the following examples, certain conventional techniques are performed as described below:

(A) COLUMN CHROMATOGRAPHY

In a column having a diameter to length ratio of about 1/10, filled with silica (Merck, 0.008 mm.), the mixture to be separated is charged in a weight proportion equal to or lower than 1/10 of the weight of silica. The chromatogram is developed with benzene and the elution is carried out with benzene-chloroform solutions containing increasing amounts of chloroform.

(B) VAPOUR PHASE CHROMATOGRAPHY

This is performed on a 4 m. Carbowax column, at temperatures from 100 to 250° C. with a helium stream.

(C) REDUCTION OF THE CARBONYL TO THE ALCOHOL FUNCTION

Lithium aluminium hydride (0.1 to 0.2 mole) is suspended in ether (100 ml.) under nitrogen protection and a solution of 0.2 mole of the aldehyde or ketone to be reduced in ether (100 ml.) is added dropwise at room temperature. Thereafter, the excess of reducing agent is destroyed with water (5–10 ml.), and the mixture is filtered, concentrated and distilled under reduced pressure.

Temperatures are given in degrees centigrade.

Example 1.—Preparation of α- and β-sinensal [1]

A mixture of 10 g. of 2-methyl-6-vinyl-2,6-heptadien-1-ol, 25 g. of methylbutadienyl ethyl ether, 6.6 g. of mercuric acetate and 2.7 g. of powdered sodium acetate is heated for 18 hours at 98° under nitrogen protection. After cooling, the solid materials are filtered and the liquid phase is neutralised by stirring with anhydrous potassium carbonate. Then distillation is effected in a high vacuum, and the fraction distilling over at 80°/0.001 torr is collected. This fraction comprises β-sinensal whose purity is higher than 90% according to gas-chromatographic analysis (yield 43%). In the NMR the methyl group present in the portion of the field with the highest intensity has a resonance at $\delta=1.60$ p.p.m. (corrected value). The mass and IR spectra are in agreement with those of natural β-sinensal (cf. J. Org. Chem. 30, 1690 (1965)), and the dinitrophenylhydrazone of synthetic β-sinensal (M.P. 80–81°) does not show any depression of the M.P. in admixture with the dinitrophenylhydrazone of natural β-sinensal.

When using the same method and the same amounts of reactants but replacing the above vinylheptadienol by its isomer, 3,7-dimethyl-1,3,6-octatrien-8-ol, α-sinensal is obtained in a comparable yield, its dinitrophenylhydrazone melting at 96–98°. The α- and β-sinensals prepared according to the above example have valuable flavouring properties and are useful in the flavour industry.

Example 2.—Preparation of trans- and cis-2,7,11-trimethyl-2,6,10-dodecatrien-1-al A mixture of 10 g. of geraniol, 25 g. of methylbutadienyl ethyl ether, 6.6 g. of mercuric acetate and 2.7 g. of sodium acetate is heated for 18 hours at 98° under nitrogen protection. After cooling, the liquid phase is neutralised and separated as indicated in Example 1, then distilled in a high vacuum. 9.3 g. of distillate are obtained which is purified by chromatography on a silica column. The analytical sample of 2,7,11-trimethyl-trans-cis-2,6,10-dodecatrien-1-al thus obtained is again redistilled and converted into its dinitrophenylhydrazone, M.P. 83–84°.

*Analysis.*—Calculated for $C_{21}H_{28}O_4N_4$ (percent): C, 62.98; H, 7.05; N, 14.0. Found (percent) C, 62.47; H, 7.29; N, 14.5.

When replacing in the above mixture geraniol by nerol and proceeding exactly under the same conditions, 11.5 g. of crude 2,7,11-trimethyl-trans-trans-2,6,10-dodecatrien-1-al are obtained, the dinitrophenylhydrazone of which melts at 102–104°.

*Analysis.*—Calculated for $C_{21}H_{28}O_4N_4$ (percent): C, 62.98; H, 7.05; N, 14.0. Found (percent): C, 63.6; H, 7.23; N, 14.8.

The aldehydes prepared according to the above example have valuable odoriferous and flavouring properties and are useful in the perfume and flavour industry.

Example 3.—Preparation of 2-methyl-2,6-octadien-1-al

A mixture of crotyl alcohol (20 g.), 2-methylbutadienyl ethyl ether (50 g.), mercuric acetate (6.6 g.) and sodium

---

[1] The nomenclature is that adopted recently (in the past, α was used in place of β and vice versa).

acetate (2.7 g.) is heated for 17 hours at 100° under nitrogen. After cooling, anhydrous potassium carbonate (5 g.) is added, the mixture is vigorously stirred and filtered. The filtrate is distilled and filtered. The filtrate is distilled and the fraction distilling over at 78–80°/10 torr is collected. There is thus obtained a yield of 40% of 2-methyl-2,6-octadien-1-al which is practically pure according to gas chromatography. The following derivatives are readily prepared by means of the usual methods: dinitrophenylhydrazone, M.P. 139–140°, semicarbazone, M.P. 153–155°.

The aldehyde prepared according to the above example have valuable odoriferous and flavouring properties and is useful in the perfume and flavour industry.

Example 4.—Preparation of 2,6-dimethyl-2,6-octadienal

A mixture of 65 g. of tiglic alcohol, 150 g. of 2-methylbutadienyl ethyl ether, 18 g. of mercuric acetate and 8 g. of sodium acetate is heated for 17 hours at 100° C. under nitrogen protection. After cooling and filtration, distillation yields 59.6 g. of a liquid the major portion of which boils between 90 and 96°/10 torr. This liquid is purified by vapour phase chromatography and is shown to contain 20% of 2,6-dimethyl-cis-trans-2,6-octadienal (A) and 80% of 2,6-dimethyl-trans-trans-2,6-octadienal (B). The NMR data are as follows:

|  | δ p.p.m. | |
| --- | --- | --- |
|  | Isomer A | Isomer B |
| Aldehyde proton | 10.01 | 9.26 |
| Methylene protons C-4 | 2.65 | 2.32 |
| Methyl protons C-2 | 1.73 | 1.70 |
| Methyl protons C-6 | 1.61 | 1.61 |

Elemental analysis of isomer B and of two of its derivatives, the semicarbazone and the 2,4-dinitrophenylhydrozone, gives the following results:

Calculated for $C_{10}H_{16}O$ (percent): C, 78.89; H, 10.59. Found (B) (percent): C, 78.98; H, 10.66.

Calculated for $C_{11}H_{19}N_3O$ (percent): C, 63.12; H, 9.15; N, 20.08. Found for the semicarbazone (percent): 63.27; H, 9.36; N, 19.97 (M.P. 175–6°).

Calculated for $C_{16}H_{20}N_4O_4$ (percent): N, 16.86. Found for the 2,4-dinitrophenylhydrazone (percent): N, 16.87.

The aldehydes prepared according to the above example have valuable odoriferous and flavouring properties and are useful in the perfume and flavour industry.

By reduction of the mixture of isomers A and B with lithium aluminium hydride there is obtained in a nearly quantitative yield a mixture of the corresponding alcohols (A′ and B′) in proportions equivalent to those of the mixture of A and B. B.P. 105–110°/100 torr. NMR spectrum:

|  | δ p.p.m. | |
| --- | --- | --- |
|  | Isomer A′ (cis-trans) | Isomer B′ (trans-trans) |
| —CH₂OH | 3.98 | 3.84 |
| Methyl C-2 | 1.73 | 1.60 |
| Methyl C-6 | 1.59 | 1.59 |
| Methyl (terminal) | 1.54 | 1.54 |

The above alcohols are useful intermediates for the synthesis of compounds useful in the perfume and flavour industry.

Example 5.—Preparation of 2,6,10-trimethyl-2,6,10-dodecatrienal 2 g. of 2,6-dimethyl-2,6-octadienol, isomer A′, prepared according to Example 4, are heated together with 5 g. of 2-methylbutadienyl ethyl ether and 1 g. of mercuric acetate for 18 hours at 100°. After filtration and distillation (B.P. 90–95°/0.01 torr) there are obtained 1.8 g. of 2,6,10-trimethyl-2,6,10-dodecatrienal in the form of the trans-trans-trans isomer of about 80% purity as shown by vapour phase chromatography. NMR spectrum: 1.58 p.p.m., 3H, d.; 1.62 p.p.m., 6H; 1.71 p.p.m., 3H; 5.1 p.p.m., 2H, broad band; 6.37 p.p.m., 1H, t., J=7 cps. Mass spectrum (m./e.): molecular peak 220; other fragments: 41 (100), 67 (100), 55 (90), 81 (85), 93 (70), 137 (60).

When in the above example isomer 1–A′ is replaced by isomer 1–B′ (Example 4), there are obtained 1.7 g. of a product which is identical with that obtained from 1–A′ according to gas-chromatographic analysis.

The above product was valuable odoriferous and flavouring properties and is useful in the perfume and flavour industry.

Example 6.—Preparation of 2-methyl-5-(2-furyl)-2-pentenal

A mixture of 20 g. of furfuryl alcohol, 50 g. of 2-methylbutadienyl ethyl ether, 6.6 g. of mercuric acetate and 2.7 g. of anhydrous sodium acetate is heated for 18 hours at 100°. After filtration and distillation (B.P. 48–49°/0.05 torr) there are isolated 21 g. of a product which, by gas-chromatographic analysis, is shown to be 2-methyl-5-(2-furyl)-2-pentenal of 85% purity. It is purified by chromatography on silica. The double bond has trans configuration (about 95%). NMR spectrum: H (aldehyde) at δ=9.28 p.p.m.; methyl group at δ=1.69 p.p.m.; H (vinyl) at δ=6.39 p.p.m.

The elemental analyses of the product as well as of two of its derivatives are as follows:

Calculated for $C_{10}H_{12}O_2$ (percent): C, 73.14; H, 7.37. Found (percent): C, 73.14; H, 7.47.

Calculated for $C_{11}H_{15}N_3O_2$ (percent): C, 59.71; H, 6.83; N, 18.99. Found for the semicarbazone (percent): C, 59.84; H, 7.00; N, 18.70.

Calculated for $C_{16}H_{16}N_4O_5$ (percent): C, 55.81; H, 4.68; N, 16.27. Found for the 2,4-dinitrophenylhydrazone (percent): C, 56.10; H, 5.29; N, 15.70.

The above product has valuable oderiferous and flavouring properties and is useful in the perfume and flavour industry.

3.4 g. of the aldehyde obtained above are reduced with lithium aluminium hydride. There are thus obtained 2.3 g. of 2-methyl-5-(2-furyl)-2-pentenol, B.P. 66°/0.02 torr. The NMR spectrum shows the C–1 methylene protons at δ=3.85 p.p.m. and the C–2 methyl protons at δ=1.56 p.p.m.

The above alcohol is a useful intermediate for the synthesis of compounds useful in the perfume and flavour industry.

Example 7.—Preparation of 2-methyl-5-(2-furyl)-1-pentene

A solution of 2.5 g. of 2-methyl-5-(2-furyl)-2-pentenal prepared according to Example 6 and 3 g. of hydrazine hydrate in 50 ml. of ethylene glycol is refluxed for 30 min. Thereafter, a concentrated aqueous potassium hydroxide solution prepared from 12 g. of KOH is added and the mixture is slowly distilled for 1 hour. The distillate is extracted with pentane and the extract distilled, B.P. 37°/0.03 torr. According to the NMR analysis the methyl group of the product is observed at δ=1.70 p.p.m. and the vinyl protons at δ=4.70 p.p.m.

Analysis.—Calculated for $C_{10}H_{14}O$ (percent): C, 79.95; H, 9.39. Found (percent): C, 80.70; H, 9.48.

The above hydrocarbon has valuable odoriferous and flavouring properties and is useful in the perfume and flavour industry.

Example 8.—Preparation of 2-methyl-5-(3-furyl)-2-pentenal

A mixture of 10 g. of 3-hydroxymethylfuran, 25 g. of 2-methylbutadienyl ethyl ether, 3.3 g. of mercuric acetate and 1.4 g. of sodium acetate is heated for 20 hours at 100°. After filtration there are obtained by distillation 14.2 g. of a liquid, B.P. 135°/10 torr, which is then heated at elevated temperature for a short period. This can be achieved by introducing the liquid into a pyrolysis apparatus heated to 350–400° and simultaneously distilling the resulting product. However, higher yields are obtained by subjecting the liquid to a preparative vapour phase chromatography under usual conditions (150–200°), the injection chamber (evaporator) being maintained at 350–380°. 2-methyl-5-(3-furyl)-2-pentenal (85% trans, 15% cis) is thus collected in 70% yield. NMR of the aldehyde protons: δ=9.28 p.p.m. (trans) and δ=9.38 p.p.m. (cis).

Analysis.—Calculated for $C_{10}H_{12}O_2$ (percent): C, 73.14; H, 7.37. Found (percent): C, 72.88; H, 7.42.

The above aldehyde has valuable odoriferous and flavouring properties and is useful in the perfume and flavour industry.

Example 9.—Preparation of 2,7,11-trimethyl-trans-cis-2,6,10-dodecatrienal

A mixture of 10 g. of geraniol, 25 g. of 2-metyl-1,1,3-triethoxybutane and 0.3 g. of 84% phosphoric acid is heated for 2 hours at 130–160°, while collecting the resulting alcohol vapours in a down-directed condenser. After cooling one neutralises with anhydrous $K_2CO_3$, filters and distills. There are collected 6.2 g. of a liquid (B.P. 100–110°/0.01 torr) which, after chromatography on $SiO_2$, yields 1 g. of 2,7,11-trimethyl-trans-cis-2,6,10-dodecatrienal whose dinitrophenylhydrazone melts at 83–84°.

Analysis.—Calculated for $C_{24}H_{28}O_4N_4$ (percent): C, 62.98; H, 7.05; N, 14.0. Found for the dinitrophenylhydrazone (percent): C, 62.47; H, 7.29; N, 14.5.

The above aldehyde has valuable odoriferous and flavouring properties and is useful in the perfume and flavour industry.

By reduction of 2,7,11-trimethyl-trans-cis-2,6,10-dodecatrienal with lithium aluminum hydride there is obtained the corresponding alcohol in a nearly quantitative yield.

The above alcohol is a useful intermediate for the synthesis of compounds useful in the perfume and flavour industry.

Example 10.—Preparation of 2,7,11-trimethyl-trans-cis-2,6,10-dodecatrienal

A mixture of 20 g. of geraniol, 100 g. of 1,1,3-triethoxy-2-methylbutane, 5 g. of amonium dihydrogen phosphate and 5 g. of mercuric acetate is heated under the same conditions as in Example 9. The cooled solution is neutralised with anhydrous $K_2CO_3$ and then distilled in a vacuum of 0.001 torr. The distillate is chromatographed on $SiO_2$ and gives 8.5 g. of pure 2,7,11-trimethyl-trans-cis-2,6,10-dodecatrienal, identical with the product obtained in Example 9.

The above aldehyde has valuable odoriferous and flavouring properties and is useful in the perfume and flavour industry.

Example 11.—Preparation of 2,7,11-trimethyl-trans-trans-2,6,10-dodecatrienal

A mixture of 100 g. of nerol, 10 g. of mercuric acetate, 10 g. of ammonium dihydrogen phosphate and 500 g. of 2-methyl-1,1,3-triethoxybutane is heated for 3½ hours under the same conditions as in Example 9. By neutralisation with anhydrous $K_2CO_3$, filtration and distillation in a vacuum of 0.001 torr there are obtained 102 g. of a liquid which is fractionated by means of a spinning-band column. There are obtained 43.2 g. of pure 2,7,11-trimethyl-trans-trans - 2,6,10-dodecatrienal B.P. 87–89°/0.001 torr.

The above aldehyde has valuable odoriferous and flavouring properties and is useful in the perfume and flavour industry.

Example 12.—Preparation of 2-methyl-4-(2-thenyl)-2-butenal

A mixture of 10 g. of 2-hydroxymethylthiophene, 25 g. of 2-methylbutadienyl ethyl ether, 3.3 g. of mercuric acetate and 1.75 g. of sodium acetate is heated for 18 hours at 100°. After diltration and distillation there are obtained 12 g. of distillate which is chromatographed on silica. Di-(2-thenyl) ether is isolated and then 2-methyl-4-(2-thenyl)-2-butenal. NMR spectrum: δ=1.69 p.p.m., 3H (methyl); 3.2 p.p.m., 4H (—$CH_2$—); 6.39 p.p.m., 1H, t., broad (H, vinyl); 9.27 p.p.m., 3H (heterocyclic H).

Analysis.—Calculated for $C_{10}H_{12}OS$ (percent): C, 66.65; H, 6.71. Found (percent): C, 66.76; H, 6.96.

The above aldehyde has valuable flavouring properties and is useful in the flavour industry.

Example 13.—Preparation of 5-(2-furyl)-2-pentenal

A mixture of 10 g. of furfuryl alcohol, 20 g. of trans-butadienyl ethyl ether, 3.3 g. of mercuric acetate and 1.75 g. of sodium acetate is heated for 15 hours at 100°. After filtration and distillation there are obtained 10 g. of a mixture containing about 65% of 5-(2-furyl)-2-trans-pentenal (A) and about 35% of 2-(2-methyl-3-furyl)-2-butenal (B) according to vapour phase chromatography. The results of the NMR spectra are the following:

| | δ p.p.m. | |
| --- | --- | --- |
| | A | B |
| H aldehyde | 9.38 | 9.41. |
| H vinyl | about 6, 2H | 6.70, 1H, q, J=7 cps. |
| Methyl | | 2.11, 3H. |
| Methyl | | 1.93, 3H, d, J=7 cps. |
| —$CH_2$— | 2.4–3.0, 4H | |

The aldehyde B has valuable odoriferous and flavouring properties and is useful in the perfume and flavour industry.

Example 14.—Preparation of 9-(3-furyl)-2,6-dimethyl-2,6-nonadienal (torreyal)

11.2 g. of 5-(3-furyl)-2-methyl-2-pentenal prepared according to Example 8 are reduced with 1.5 g. of lithium aluminum hydride in dry ether to obtain 5-(3-furyl)-2-methyl-2-pentenol. This alcohol (6.5 g.) is heated with 20 g. of 2-methylbutadienyl ethyl ether, 3.3 g. of mercuric acetate and 1.7 g. of sodium acetate for 18 hours at 100°. By usual treatment there are obtained 7.4 g. of a mixture, B.P. 85–111° at 0.001 torr. The crude torreyal thus obtained is purified by chromatography on 50 g. of silica. After a trace of impurity eluted by 100 ml. of benzene, pure torreyal is eluted by a benzene-ether mixture (9:1). Microdistillation shows a B.P. 93–95°/0.001 torr.

Analysis.—Calculated for $C_{15}H_{20}O_2$ (percent): C, 77.5; H, 8.68. Found (percent): C, 77.38; H, 8.88.

The NMR spectrum is identical with the spectrum of natural torreyal isolated from *Torreya nucifera* (Bull. Chem. Soc. Japan 38, 381 (1965)) with the exception of an additional peak at δ=9.97 p.p.m. due to the presence of the cis-aldehyde (about 15% of the total). The mass and IR spectra are identical with those of the natural product. This product has valuable flavouring properties and is useful in the flavour industry.

Example 15.—Preparation of 9-(3-furyl)-2,6-dimethyl-2,6-nonadienol (neotorreyol)

0.6 g. of torreyal are reduced with lithium aluminum hydride in ether. The product is isolated by distillation B.P. 110°/0.001 torr. The NMR, mass and IR spectra are identical with the spectra already published (see ref. in Example 14).

Analysis.—Calculated for $C_{15}H_{22}O_2$ (percent): C, 76.88; H, 9.46. Found (percent): C, 77.03; H, 9.38.

This product has valuable odoriferous and flavouring properties and is useful either as a flavouring or odoriferous agent or as an intermediate for the preparation of odoriferous and/or flavoring agents.

Example 16.—Preparation of β-(4,8-dimethyl-3,7-nonadienyl)-furan (dendrolasin)

0.35 g. of neotorreyol is dissolved in 5 ml. of absolute ether and 0.285 g. of p-toluenesulfonyl chloride is added. During 3 hours at 0°, 0.17 g. of dry powdered KOH are added with constant agitating. The agitation is continued for a further 3 hours during which time the mixture cools down to room temperature. After filtration and concentration at room temperature, 25 ml. of tetrahydrofuran are added and then, at 0°, 0.2 g. of lithium aluminum hydride. After allowing the mixture to come to room temperature again, the excess hydride is decomposed with water and the mixture filtered and concentrated. The crude dendrolasin is purified by vapour phase chromatography at 200°. It possesses the same properties, retention time, NMR, IR and mass spectra as the natural product.

*Analysis.*—Calculated for $C_{15}H_2O$ (percent): C, 82.51; H, 10.16. Found (percent): C, 82.68; H, 10.01.

Dendrolasin has valuable odoriferous and flavoring properties and is useful in the perfume and flavouring industry.

Example 17.—Preparation of 2-methyl-4-(8-α-pinenyl)-2-butenal 10 g. of primary myrtenol, 25 g. of 2-methylbutadienyl ethyl ether, 3.3 g. of mercuric acetate and 1.75 g. of sodium acetate are heated for 36 hours at 100° under nitrogen. After cooling, the mixture is filtered and distilled. 5 g. of crude 2-methyl-4-(8-α-pinenyl)-2 - butenal, B.P. 105°/0.05 torr, are collected and purified by column-chromatography on $SiO_2$.

The corresponding alcohol, B.P. 115–120°/0.03 torr, is obtained by reduction of this aldehyde with lithium aluminium hydride. The NMR spectrum of this alcohol shows the following characteristic absorbtions: $\delta=1.63$ p.p.m., vinyl methyl group; $\delta=5.2$ and 5.4 p.p.m., vinyl protons.

The above aldehyde has valuable odoriferous and flavouring properties and is useful in the perfume and flavour industry.

Example 18

A mixture of 30 g. of cis-carveol, 75 g. of 2-methylbutadienyl ethyl ether, 9.9 g. of mercuric acetate and 5.25 g. of sodium acetate are heated 20 hours at 100° in a nitrogen atmosphere. The product is filtered, distilled and then heated at elevated temperature for a short period. This can be achieved by following the technique described in Example 8. The product obtained thereby consists of two fractions collectable at the output of the vapour phase chromatography column: These fractions, identified as the isomer cis and trans of 2-methyl-4-(1-methyl-4-isopropenyl-1-cyclohexen-6-yl)-2 - butenal, have valuable odoriferous properties and are useful in the perfume industry. NMR spectrum: $\delta=10.03$ p.p.m. (cis-aldehyde); $\delta=9.30$ p.p.m. (trans-aldehyde).

I claim:

1. A process for the preparation of olefinically α,β-unsaturated carbonyl compounds which contain at least seven carbon atoms and as a building unit at least one group having the following carbon skeleton

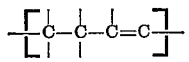

which comprises condensing, by heating at a temperature from about 60° to 400° C. in the presence of a condensing agent, effective for condensing (i) or (ii) with (iii) as hereinafter defined either (i) a butadienyl ether of formula

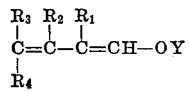

wherein Y represents a linear or branched alkyl radical containing from 1 to 4 carbon atoms, or a benzyl, p-nitrobenzyl or furfuryl radical, and each of the symbols $R_1$, $R_2$, $R_3$ and $R_4$ represents hydrogen or a linear or branched alkyl radical containing from 1 to 6 carbon atoms, or (ii) a substance capable of generating a butadienyl ether of Formula I under the condensation conditions, with (iii) an allyl alcohol which contains at least three carbon atoms and at least four carbon atoms less than the required end product and which corresponds to formula

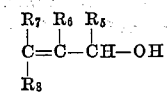

wherein each of the symbols $R_5$, $R_6$, $R_7$ and $R_8$ represents hydrogen, or (a) a linear or branched alkyl radical containing from 1 to 8 carbon atoms, or (b) a linear or branched olefinically unsaturated hydrocarbon radical containing at most two double bonds and from 2 to 8 carbon atoms, or wherein (c) $R_5$, $R_6$ and $R_7$ or $R_8$ have the meaning defined sub (a) and (b) whereas either $R_7$ or $R_8$ represents a substituted ethyl radical carrying on the terminal carbon atom as a substituent an unsubstituted or mono- or di-methyl-substituted five- or six-membered olefinically unsaturated cycloaliphatic group containing at most two double bonds one of which is in the α-position with respect to the said terminal carbon atom, or a substituted ethyl radical carrying on the terminal carbon atom as a substituent an unsubstituted or mono- or dimethyl-substituted seven-membered olefinically unsaturated bridged cycloaliphatic group containing a double bond in the α-position with respect to the said terminal carbon atom, or a substituted ethyl radical carrying on the terminal carbon atom as a substituent a 2- or 3-furyl, or 2- or 3-thienyl group, and wherein (d) two of the radicals represented by the symbols $R_5$, $R_6$, $R_7$ and $R_8$ can be linked to each other, except $R_5$ to $R_6$, to form a five- or six-membered olefinically unsaturated cycloaliphatic ring which contains at most two double bonds and which can carry as substituents alkyl or alkenyl groups containing from 1 to 3 carbon atoms, or a six-membered olefinically unsaturated bridged cycloaliphatic ring which contains one double bond and which can carry one or two methyl groups, or a furan or thiophene ring which can carry a methyl group, in order to form a carbonyl compound of formula

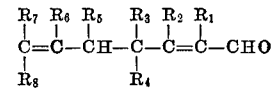

wherein the symbols $R_1$ to $R_8$ have the meaning defined above.

2. Process according to claim 1 which comprises using as a condensing agent at least one member selected from the group consisting of mineral and organic acids and their magnesium, aluminum, chromium, manganese, silver, cadmium, mercury, iron, cobalt, and palladium salts, and acidic salts.

3. Process according to claim 1 which comprises using as a condensing agent mercuric acetate, phosphoric acid or ammonium dihydrogen-phosphate.

4. Process according to claim 1 which comprises carrying out the condensation in the presence of an organic solvent selected from the group consisting of aromatic hydrocarbons, polyethylene glycol ethers and halogenated or nitrated aromatic hydrocarbons.

5. Process according to claim 1 which comprises using as a solvent an excess of one of the starting compounds.

6. Process according to claim 1 which comprises carrying out the condensation in an inert atmosphere.

7. Process according to claim 1 which comprises repeating at least once the said condensation with as a starting allyl alcohol a compound resulting from the reduction of a carbonyl compound obtained by a preceding condensation in order to form a carbonyl compound of Formula III comprising at least two of the said building units.

8. Process according to claim 1 which comprises using as a substance capable of generating a butadienyl ether of Formula I under the condensation conditions a compound of formula

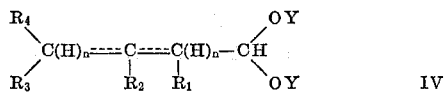

which contains one double bond in one of the positions indicated by the dotted lines and in which one of the symbols $n$ is zero and the other one is the figure 1 and Y, $R_1$, $R_2$, $R_3$ and $R_4$ have the same meaning as in Formula I.

9. Process according to claim 1 which comprises using as a substance capable of generating a butadienyl ether of Formula I under the condensation conditions a compound of formula

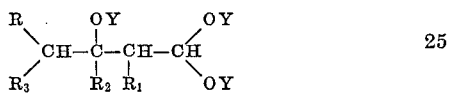

wherein Y, $R_1$, $R_2$, $R_3$ and $R_4$ have the same meaning as in Formula I.

10. Process according to claim 1 which comprises using as a starting butadienyl ether a compound of Formula I wherein $R_1$ is methyl and $R_2$, $R_3$ and $R_4$ are hydrogen.

11. Process according to claim 1 which comprises using as a starting butadienyl ether a compound of Formula I wherein $R_1$, $R_2$, $R_3$ and $R_4$ are hydrogen.

12. Process according to claim 1 which comprises using as a starting allyl alcohol a compound of Formula II wherein $R_5$ and $R_7$ are hydrogen, $R_6$ is methyl and $R_8$ is a methyl, 2-(furyl-3)-ethyl, 2-methylene-4-pentenyl or 3-methyl-2,4-pentadienyl.

13. Process according to claim 1 which comprises using as a starting allyl alcohol a compound of Formula II wherein $R_5$ and $R_7$ are hydrogen and $R_6$ and $R_8$ are linked to each other, and together with their carrier carbon atoms, form a furan, thiophene or 7,7-dimethyl-3-bicyclo(3.1.1) heptene ring.

14. Process according to claim 1 which comprises using as a starting allyl alcohol a compound of Formula II wherein $R_5$ and $R_6$ are hydrogen, $R_7$ is methyl and $R_8$ is a 4-methyl-3-pentenyl radical.

15. Process according to claim 1 which comprises using as a starting allyl alcohol a compound of Formula II wherein $R_5$, $R_6$ and $R_7$ are hydrogen and $R_8$ is a 3-methyl-3-pentenyl radical.

16. Process according to claim 1 which comprises using as a starting allyl alcohol a compound of Formula II wherein $R_6$ is hydrogen, $R_8$ is methyl and $R_5$ and $R_7$ are linked to each other and, together with their carrier carbon atoms, form a 2-methyl-5-isopropyl-1-cyclohexene ring.

17. Process according to claim 1 which comprises using as a starting allyl alcohol a compound of Formula II wherein $R_6$ is methyl, $R_8$ is hydrogen and $R_5$ and $R_7$ are linked to each other and, together with their carrier carbon atoms, form a 2-methyl-5-isopropenyl-1-cyclohexene ring.

18. 5-(2-furyl)-2-pentenal.
19. 2-methyl-5-(2-furyl)-2-pentenal.
20. 2-methyl-5-(2-furyl)-2-pentenol.
21. 2-methyl-5-(2-furyl)-1-pentene.
22. 2-methyl-5-(3-furyl)-2-pentenal.
23. 2-methyl-5-(3-furyl)-2-pentenol.
24. 2-methyl-4-(2-thenyl)-2-butenal.

References Cited

UNITED STATES PATENTS 2,995,600   8/1961   Webb _____ 260—488

OTHER REFERENCES

British Pat. No. 755,667, C.A. 51: 8797–8 (June 1957).
Montavon, C.A. 52: 4562 (March 1958).
Stadler, C.A. 52: 9031–2 (June 1958).
Petrov, C.A. 52: 20027 (November 1958).
Skvortsova, C.A. 57: 16662–3 (December 1962).
Genusov et al.: C.A. 58: 11229 (May 1963).
Fieser et al.: Adv. Org. Chem. (Reinhold, N.Y., 1962), p. 293–4.
Roberts et al.: Basic Principles of Org. Chem. (Benjamin, N.Y., 1964), p. 455–9.

HENRY R. JILES, Primary Examiner

C. M. SHURKO, Assistant Examiner

U.S. Cl. X.R.

99—140; 252—522; 260—347.8, 598, 601 R, 617 R, 631.5, 630

UNITED STATES PATENT OFFICE
CERTIFICATE OF CORRECTION

Patent No. 3,654,309          Dated April 4, 1972

Inventor(x) ALAN FRANCIS THOMAS

It is certified that error appears in the above-identified patent and that said Letters Patent are hereby corrected as shown below:

Column 2, lines 35-40 "⟨structure⟩" should read -- ⟨structure with O⟩ --.

Column 3, line 26 "terminal carbon atoms" should read --terminal carbon atom--.

Column 3, line 35 "seven-members" should read --seven-numbered--.

Column 3, line 56 "
$$R_7 \; R_6 \; R_5 \quad R_3 \; R_2 \; R_2$$
$$\;|\;\;\;|\;\;\;|\quad\;|\;\;\;|\;\;\;|$$
$$C = C - CH - C - C = C - CHO$$
$$\;|\qquad\qquad\;|$$
$$R_8 \qquad\quad\; R_4$$
" should read $$--R_7 \; R_6 \; R_5 \quad R_3 \; R_2 \; R_1$$
$$\;\;\;\;|\;\;\;|\;\;\;|\quad\;|\;\;\;|\;\;\;|$$
$$\;\;\;C = C - CH - C - C = C - CHO$$
$$\;\;\;|\qquad\qquad\;|$$
$$\;\;\;R_8 \qquad\quad\; R_4 \;\;--$$

Column 6, line 34 "$CH_3-CH=CH_2OH \cdot \ldots$" should read
$$\qquad\qquad\qquad\qquad\quad\; | $$
$$\qquad\qquad\qquad\qquad\; CH_3$$

$$--CH_3-CH=C-CH_2OH \cdot \ldots --$$
$$\qquad\qquad\;\;|$$
$$\qquad\qquad CH_3$$

Column 9, line 51 "105-110°/100 torr." should read --105-110°/10 torr.--

Column 10, line 2 "67(100), 55(90)" should read --69(100), 55(90)--.

Column 13, line 66--The formula should be indicated as "I"

Column 15, line 24 "
$$R_4 \searrow \quad\; OY \qquad\;\; OY$$
$$\quad\; CH-C-CH-CH$$
$$R_3 \nearrow \quad\; R_2 R_1 \;\;\searrow OY$$
" should read $$--R_4 \searrow \quad\; OY \qquad\;\; OY --$$
$$\quad\;\;\; CH-C-CH-CH$$
$$\;\;R_3 \nearrow \quad\; R_2 R_1 \;\;\searrow OY$$

Signed and sealed this 5th day of December 1972.

(SEAL)
Attest:

EDWARD M. FLETCHER, JR.                  ROBERT GOTTSCHALK
Attesting Officer                          Commissioner of Patents